US006825586B2

(12) United States Patent
Edrington

(10) Patent No.: US 6,825,586 B2
(45) Date of Patent: Nov. 30, 2004

(54) ONE PIECE STATOR LEAD AND TERMINAL INSULATOR

(75) Inventor: Samuel R. Edrington, Noblesville, IN (US)

(73) Assignee: Remy, Inc., Anderson, IN (US)

( * ) Notice: Subject to any disclaimer, the term of this patent is extended or adjusted under 35 U.S.C. 154(b) by 0 days.

(21) Appl. No.: 10/282,782

(22) Filed: Oct. 29, 2002

(65) Prior Publication Data

US 2004/0080222 A1 Apr. 29, 2004

(51) Int. Cl.[7] .................................................. H02K 5/22
(52) U.S. Cl. .................................... 310/71; 310/68 D
(58) Field of Search .............................. 310/71, 68 D, 310/89, 67 R

(56) References Cited

U.S. PATENT DOCUMENTS

| | | | | |
|---|---|---|---|---|
| 2,583,804 A | * | 1/1952 | Andrus | 310/87 |
| 3,027,475 A | | 3/1962 | Gaudry | |
| 3,457,442 A | | 7/1969 | Charlton et al. | 310/71 |
| 3,539,850 A | | 11/1970 | Sato | |
| 3,596,120 A | | 7/1971 | Potter | 310/61 |
| 3,780,323 A | | 12/1973 | Swain | |
| 3,912,957 A | | 10/1975 | Reynolds | 310/214 |
| 4,215,464 A | | 8/1980 | Miller | 29/596 |
| 4,316,112 A | | 2/1982 | Waldron et al. | 310/258 |
| 4,318,022 A | | 3/1982 | Miller | |
| 4,340,829 A | | 7/1982 | McCoy | |
| 4,649,305 A | * | 3/1987 | Morrill | 310/72 |
| 4,712,029 A | | 12/1987 | Nold | 310/711 |
| 4,893,041 A | | 1/1990 | Snider et al. | |
| 4,904,893 A | | 2/1990 | Snider et al. | |
| 5,043,614 A | | 8/1991 | Yockey | |
| 5,160,864 A | | 11/1992 | Saito | 310/54 |
| 5,175,458 A | | 12/1992 | Lemmer et al. | |
| 5,473,208 A | | 12/1995 | Stihi | 310/680 |
| 5,640,062 A | | 6/1997 | Yockey | |
| 5,682,070 A | | 10/1997 | Adachi et al. | 310/71 |
| 5,812,388 A | | 9/1998 | Keidar et al. | 363/145 |
| 5,949,166 A | | 9/1999 | Ooiwa et al. | 310/680 |
| 6,051,906 A | | 4/2000 | Umeda et al. | 310/179 |
| 6,100,613 A | | 8/2000 | Tanaka et al. | 310/680 |
| 6,114,783 A | | 9/2000 | Asao | 310/58 |
| 6,121,699 A | | 9/2000 | Kashihara et al. | 310/680 |
| 6,124,655 A | | 9/2000 | Jeske | 310/71 |
| 6,198,187 B1 | | 3/2001 | Asao et al. | 310/680 |
| 6,208,058 B1 | | 3/2001 | Taji et al. | 310/201 |
| 6,531,796 B1 | * | 3/2003 | Konno | 310/67 R |
| 6,628,023 B1 | * | 9/2003 | Paquet | 310/71 |

* cited by examiner

Primary Examiner—Burton S. Mullins
Assistant Examiner—Nguyen Hanh
(74) Attorney, Agent, or Firm—Thomas A. Walsh; Jay G. Taylor; Ice Miller

(57) ABSTRACT

A one-piece stator lead and terminal insulator for an oil cooled alternator comprises an arcuate plate having three cylindrical retainers positioned thereon for receiving stator terminals. The arcuate plate also includes three guides for guiding stator leads to the terminals. Furthermore, three rectangular holes are provided next to each of the guides. The rectangular holes receive insulating ties that encircle the stator leads and hold the stator leads to the plate, properly positioning the stator leads away from other conductors and housings within the alternator. Two flanges also extend from the plate to aid in assembly of the device and further act to properly position the stator leads away from other conductors and housings within the alternator.

17 Claims, 4 Drawing Sheets

ONE PIECE STATOR LEAD AND TERMINAL INSULATOR

BACKGROUND

This invention relates generally to the field of automotive alternators, and in particular the invention relates to stator leads and terminal insulators for alternators.

Typical oil cooled alternators for heavy duty applications like busses and coaches include a stator having stator windings positioned about a rotor. The stator windings are encapsulated in an oil-proof casing that includes a rectifier housing. The stator includes terminals that extend through the rectifier housing to provide an electrical connection from the exterior of the rectifier housing to the windings on the interior of the housing.

FIG. 1 shows a perspective view of a typical oil cooled heavy duty alternator 20 having the rectifier housing removed to expose the stator windings 24. The stator windings 24 include three distinct windings that make a three-phase winding set, connected in delta or wye fashion, and positioned on a stator core. The windings 24 may be made of any of several types of windings, including hairpin-type windings and copper wound windings. Three stator leads 26 are provided in association with the windings 24. The leads 26 carry current from the three-phase windings, and the electric potential between different leads is measured as the line-to-line voltage. The leads 26 are typically flexible and comprised of stranded cable. Accordingly, the term cable leads is also used herein to refer to the stator leads. Of course, any number of other conductors could be used for the stator leads, including solid copper wire or other flexible wire types. Each lead 26 is covered with a heavy fiberglass insulating sleeve 30. The insulating sleeves 30 are used to protect the leads 26 from shorting against other stator conductors should the flexible stator leads accidentally come into contact with other conductors.

The cable leads 26 are also connected to the stator terminals 28, and provide an electric path between the terminals and the three-phase windings 24. Each terminal is made of a conductive material such as brass. When a rectifier housing is placed over the stator, the terminals extend through holes in the housing to provide a conductive path from the exterior of the alternator casing 22 to the interior of the alternator casing. Each terminal 28 is associated with a square insulator 32 positioned at its base, where the cable lead 26 connects to the terminal. Each terminal is also associated with a hat-shaped insulator having a cylindrical portion and a flared round top. This hat shaped insulator is positioned over on the terminal once the rectifier housing is placed on the alternator such that the cylindrical portion seats in the terminal holes of the rectifier housing, and the flared round top rests against the exterior of the rectifier housing. These six insulators (two for each terminal) protect the terminals from inappropriate contact with the rectifier housing.

As shown in FIG. 1, before the rectifier housing is place on the alternator, the terminals 28 are only connected to the cable leads 26, and the terminals 28 are not otherwise fixed with respect to the alternator casing 22. Of course, the cable leads 26, are flexible and do not hold the terminals 28 securely in place. Thus, before assembly, the terminals 28 move independent with respect to each other. This independent movement of each terminal 28 can cause problems during assembly because it is difficult to align the freely moving terminals 28 with the holes of the rectifier housing.

After the alternator is fully assembled and placed in operation, electric current is generated in the stator windings 24 and delivered to on-board loads. However, the significant electric currents flowing through the conductors of the alternator can generates excessive heat during alternator operation. Thus, cooling oil is provided within the alternator to dissipate the heat. The cooling oil flows between the alternator conductors, directly contacting the conductors, and drawing heat away from the conductors. Still, not all conductors of the alternator come into direct contact with the cooling oil. In particular, although the insulating sleeves 30 sufficiently protect the cable leads 26 against shorting during alternator operation, they also block the cooling oil from directly contacting the cable leads. While some cooling oil migrates into the sleeves and onto the cable leads, most of the cooling oil flows around the insulating sleeves and is prevented from directly contacting the cable leads. Because a significant amount of cooling oil does not directly contact the cable leads, they are susceptible to overheating during alternator operation. Over time, the excessive heat on the cable leads can break down the conductors and their associated insulation, resulting in improper current flow and alternator malfunction.

SUMMARY

A one-piece stator lead and terminal insulator may be used to assist in alternator assembly and/or assist with alternator cooling. The insulator comprises an arcuate plate having a plurality of retainers positioned thereon. Each of the retainers includes a cylindrical portion that rises above the plate and includes a bore adapted to receive one of the stator terminals. When the stator terminals are inserted into the retainer bores, the terminals are positioned in an upright fashion, and properly spaced so the rectifier housing may be quickly and easily positioned upon the alternator with the terminals extending through the rectifier housing. The plate also includes guides that extend from the plate in the opposite direction of the retainers. The guides are used to properly position the cable leads of the alternator against the plate and direct the leads to the terminals. A plurality of holes are also positioned upon the plate near the guides. The holes are dimensioned to receive ties for securing the leads to the plate. The ties fit through the holes of the plate and encircle the leads, thereby fastening the leads against the plate. By securing the leads to the plate, the leads are properly positioned within the alternator, secured against the insulating plate, and prevented from inappropriate contact with other conductors within the alternator. Accordingly, no insulating sleeve is required around the lead, and cooling oil from the alternator easily flows around the leads. These and other features, aspects, and advantages of the present invention will become better understood with reference to the following description and appended claims.

DESCRIPTION

Figure 1:
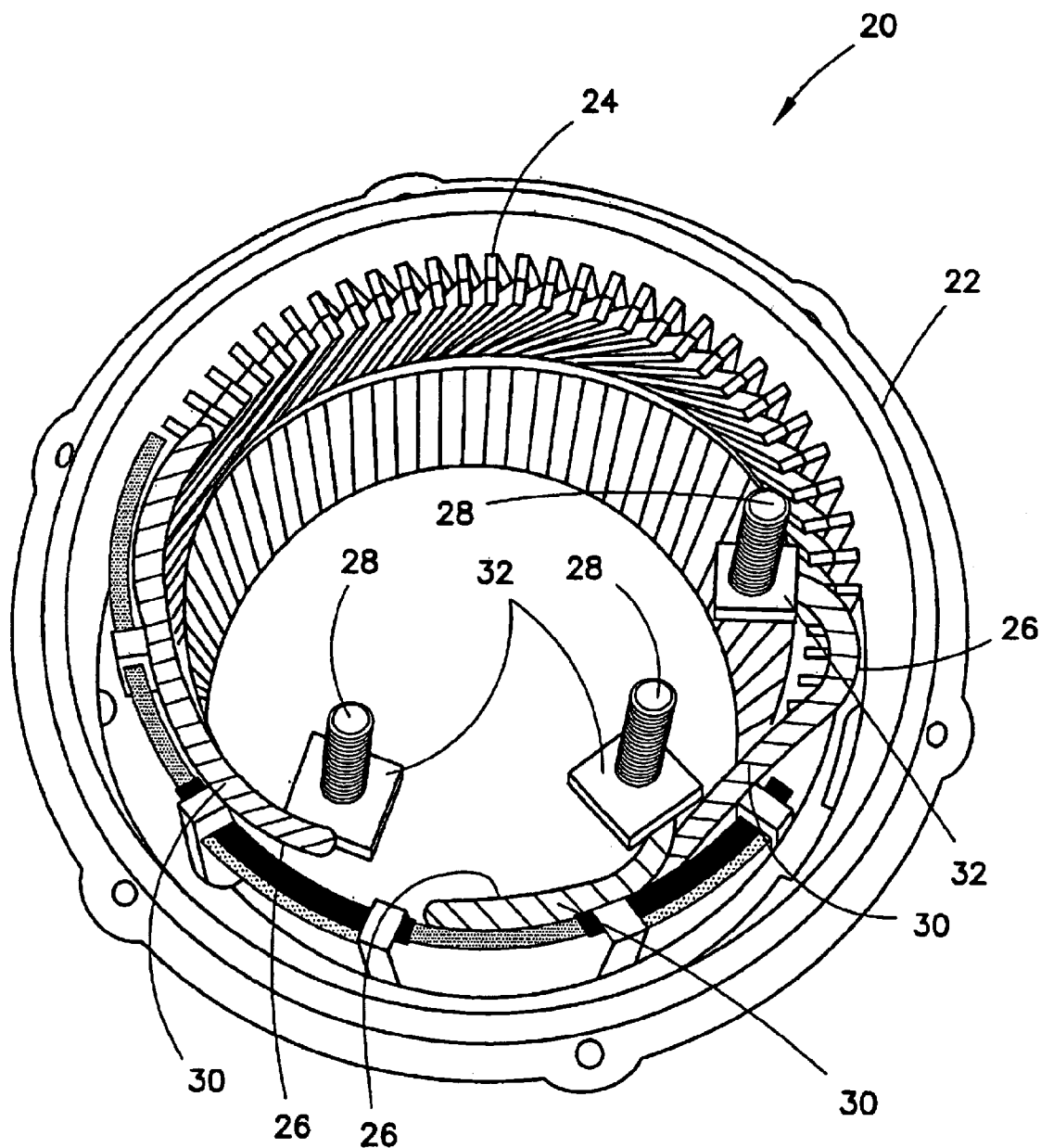
FIG. 1 shows a prior art alternator including windings, insulating sleeves, cable leads, and terminals.
Figure 2:
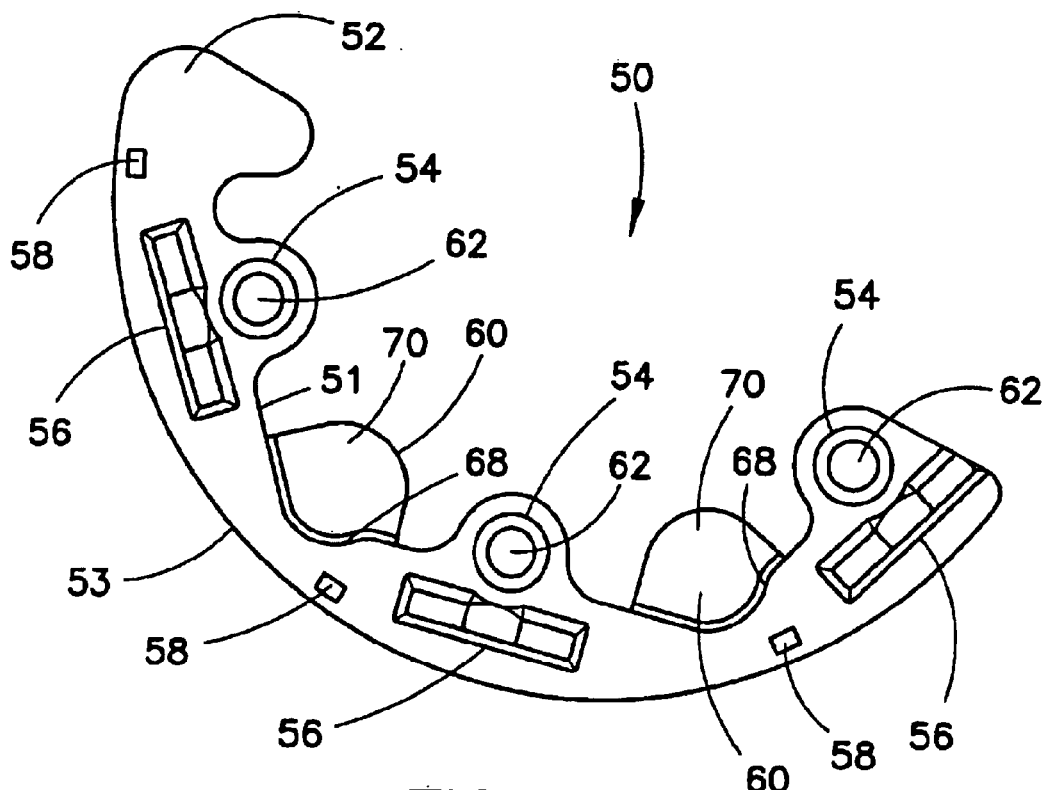
FIG. 2 shows a top view of a one-piece stator lead and terminal insulator.
Figure 3:
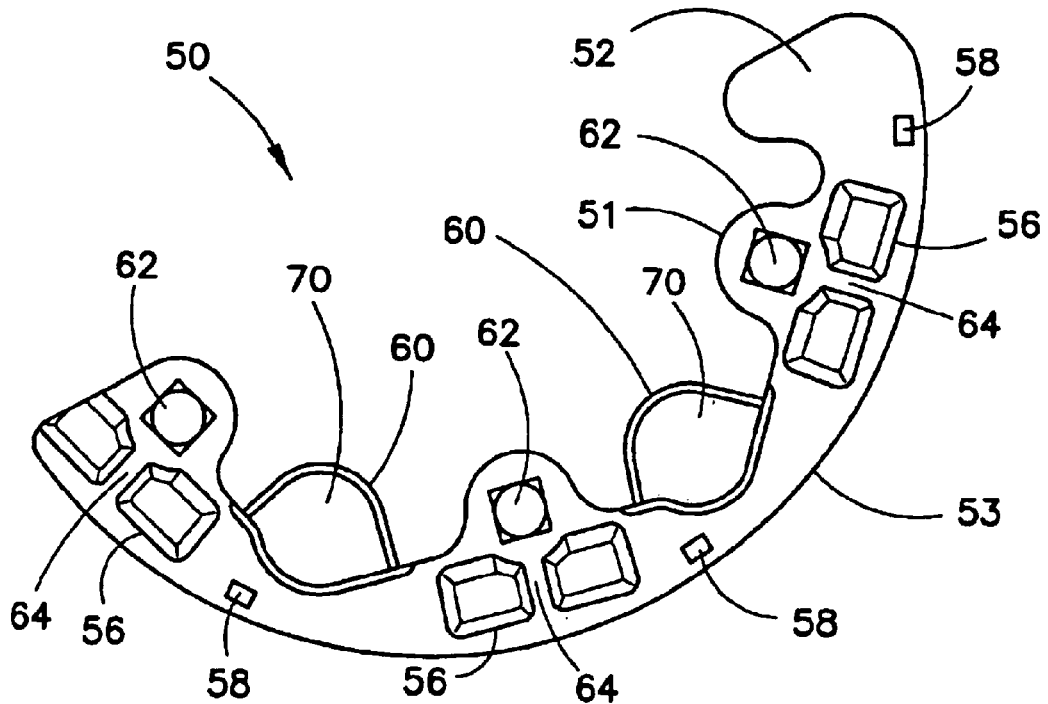
FIG. 3 shows the bottom view of the one-piece stator lead and terminal insulator of FIG. 2.

With reference to FIGS. 2–5, a one-piece stator lead and terminal insulator 50 comprises an arcuate plate 52 having three cylindrical retainers 54 positioned thereon for receiving alternator terminals 28. The arcuate place 52 also includes three guides 56 for guiding stator leads 26 to the terminals 28. Furthermore, three rectangular holes 58 are provided next to each of the guides 56. The rectangular holes 58 receive plastic ties 66 that encircle the cable leads 26 and hold the leads to the plate 52. Two flanges 60 extend from the plate to aid in assembly of the device and further act to properly position the cable leads away from other conductors within the alternator.

The arcuate plate 52 includes a substantially semi-circular exterior circumference 53 and a winding interior circumference 51. The plate 52 is designed to fit in the alternator with its exterior circumference positioned along the interior circumference of the casing, similar to the position of the stator core relative to the interior circumference of the casing. The plate 52 is made of an electrically insulating material, such as polyphenylene sulfide. However, any number of other insulating materials may be used. Furthermore, although the plate is preferably rigid, some flex may be provided without compromising the function of the plate.

The three cylindrical retainers 54 are spaced apart from each other on the plate 52 to align with holes on the rectifier housing (not shown). The retainers include a cylindrical portion that extends from the plate a distance that is about the thickness of the casing cover. Of course, the term cylindrical portion as used herein may refer to any number of shapes, and is not limited to a cylinder having a circular cross section. For example, a cylindrical portion with a rectangular cross section could also be used. Each retainer 54 is designed to receive one of the terminals 28 of the stator. Thus, each retainer 54 includes a bore 62 that snugly holds the terminal 28 when the terminal is inserted through the bore. When the three terminals 28 are all inserted into the retainers 54 of the insulator 50, they are properly spaced and positioned for insertion through the holes of the rectifier housing. When the alternator is assembled, the retainers are seated in the holes of the rectifier housing, and provide insulation between the terminals and the housing.

The three guides 56 extend from the plate in the opposite direction from the retainers 54. Each guide 56 includes a U-shaped channel 64 that leads directly to one of the retainer bores 62. These U-shaped channels are designed to receive one of the cable leads 26 and properly orient the cable lead for connection to the terminal 28 extending through the cable bore.

Figure 4:
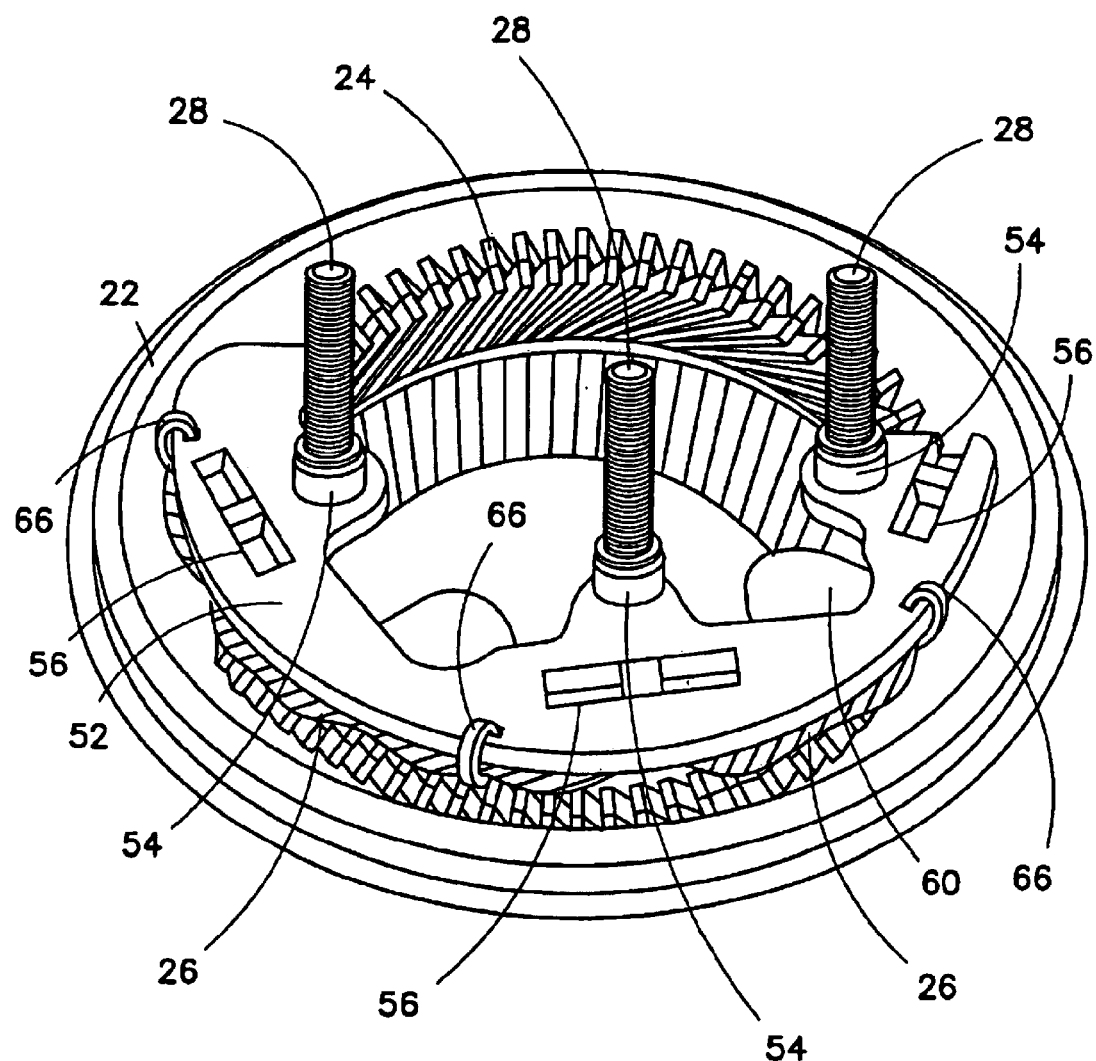
FIG. 4 shows a perspective view of the one-piece stator lead and terminal insulator of FIG. 2 positioned within an alternator.
Figure 5:
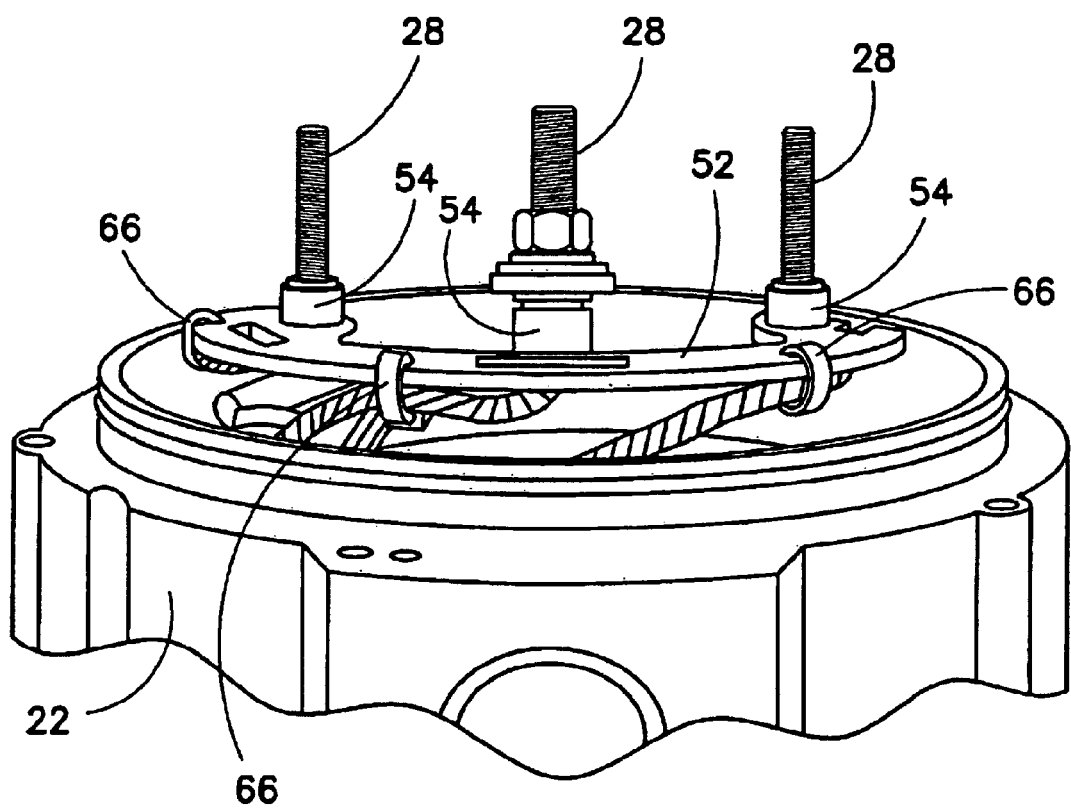
FIG. 5 shows an elevational view of the one-piece stator lead and terminal insulator of FIG. 2 positioned within an alternator.

The three rectangular holes 58 are provided along the circumference of the plate 52, next to each of the guides 56. As shown in FIGS. 4 and 5, the holes 58 each receive a tie 66 that is joined to the plate by inserting the tie through the hole and wrapping the tie around the cable lead. The ties are fastened at their ends to form a ring that encircles the cable lead and secures the cable lead to the plate. The ties are similar in structure to typical wire harnesses known in the industry for grouping sets of conductors. The ties are made of flexible insulating material capable of withstanding high heat. For example, an epoxy impregnated fiberglass cord may be used to make the ties. The term tie, as used herein, is meant to encompass any number of devices used to secure the cable leads to the plate, including, for example, channels formed in the plate through which the cable leads are fed.

The two flanges 60 each include a skirt portion 68 that extends from the plate 52, and a foot portion 70 that extends from the skirt in a direction parallel to the plate. The two flanges serve to insulate the cable leads from rectifier diodes found within the alternator. The two flanges also assist in positioning the insulator 50 over the terminals 28 by providing additional surface area to be held when a robot or human on an assembly line places the insulator 50 over the terminals.

During assembly of the alternator, the terminals are inserted into the retainer bores 62 of the insulator 50. After the terminals are inserted into the retainer bores 62, the insulator is positioned in the alternator with the exterior circumference 53 of the plate 52 aligned just inside the interior circumference of the alternator casing. Positioning of the insulator 50 within the alternator facilitates alternator assembly by properly distancing the terminals 28 from each other and orienting the terminals in an upright fashion. In particular, because the terminals are all properly aligned and directed upright, the terminals may be simultaneously placed into the holes in the rectifier housing and the rectifier housing may be easily placed directly on the alternator. Thus, use of the insulator 50 avoids the problem of terminals moving independent of each other during assembly of the alternator.

Also during assembly, ties 66 are used to secure each of the cable leads to the plate. By securing the cable leads to the insulator 50, the cable leads are fixed to an insulating member within the alternator and properly spaced apart from other conductors within the alternator. This keeps the cable leads secure and prevents them from shorting by coming into contact with other conductors or grounding to the housing. Because the cable leads are separated from other conductors and secured within the alternator, shorting is not an issue and insulating sleeves do not need to be included on the cable leads. Accordingly, cooling oil is free to come in direct contact with the leads during alternator operation, and overheating of the cable leads is avoided.

Although the present invention has been described in considerable detail with reference to certain preferred versions thereof, other versions are possible. For example, other means than ties could be used to secure the cable leads to the insulator, such as channels integrally formed on the plate. As another example, the retainers need not extend the width of the rectifier housing, but may be narrow with additional insulators inserted between the terminal and the rectifier housing. Therefore, the spirit and scope of the appended claims should not be limited to the description of the preferred versions contained herein.

What is claimed is:

1. An insulator for use with an alternator having a plurality of leads and a plurality of terminals, the insulator comprising:
   a. a plate comprising a face and a plurality of holes extending through the plate;
   b. a plurality of retainers positioned upon the plate, each of the retainers including a retainer bore dimensioned to receive one of the terminals; and
   c. a plurality of ties, each of the plurality of ties extending through one of the plurality of holes and encircling one of the plurality of leads, thereby securing the plurality of leads against the plate.

2. The insulator of claim 1 wherein the plate is arcuate.

3. The insulator of claim 1 further comprising a plurality of guides positioned upon the plate, each of the guides including a channel leading to one of the plurality of retainers.

4. The insulator of claim 1 wherein the plate is rigid.

5. The insulator of claim 1 wherein each retainer includes a cylindrical portion rising above the plate, and each cylindrical portion is adapted and dimensioned to receive one of the plurality of terminals.

6. An alternator comprising:
   a. three phase stator windings;
   b. a plurality of leads connected to the three phase stator windings;
   c. a plurality of terminals connected to the leads;
   d. a plate having a top surface and a bottom surface, the plate including a plurality of retainers extending from the top surface and a plurality of guides extending from the bottom surface, each of the plurality of retainers including a retainer bore having one of the plurality of terminals extending through the retainer bore, the plurality of guides forming channels leading directly to the retainer bores of the plurality of retainers; and
   e. a casing enclosing the three phase stator windings, the plurality of leads and the plate, the casing adapted to allow the plurality of terminals to extend through the casing.

7. The alternator of claim 6 wherein the plate is arcuate.

8. The alternator of claim 6 further comprising a plurality of ties joined to the plate for securing one of the plurality of leads to the plate.

9. The alternator of claim 8 further comprising holes positioned upon the plate, each of the plurality of holes dimensioned to receive one of the plurality of ties.

10. The alternator of claim 6 wherein the plate is rigid.

11. The alternator of claim 6 wherein each retainer includes a cylindrical portion rising above the plate, and each cylindrical portion is adapted and dimensioned to receive one of the plurality of terminals.

12. The alternator of claim 11 wherein the casing includes a plurality of holes and the cylindrical portion of each retainer is positioned within one of the plurality of holes.

13. The alternator of claim 6 wherein the plurality of leads are not covered by an insulating sleeve.

14. The insulator of claim 1 wherein each of the plurality of retainers are integral with the plate.

15. The insulator of claim 1 wherein the plurality of leads are substantially parallel to the face of the plate near the ties.

16. The insulator of claim 6 wherein each of the plurality of retainers are integral with the plate.

17. The insulator of claim 6 wherein the channels formed by the guides are U-shaped channels.

* * * * *